United States Patent [19]

de Laage de Meux

[11] 3,754,237

[45] Aug. 21, 1973

[54] COMMUNICATION SYSTEM USING BINARY TO MULTI-LEVEL AND MULTI-LEVEL TO BINARY CODED PULSE CONVERSION

[75] Inventor: Patrick de Laage de Meux, Saint-Germain-En-Laye, France

[73] Assignee: Lignes Telegraphiques et Telephoniques, Paris, France

[22] Filed: Mar. 2, 1972

[21] Appl. No.: 231,306

[30] Foreign Application Priority Data

Mar. 5, 1971 France .............................. 7107806

[52] U.S. Cl. .......................... 340/347 DD, 325/38 A

[51] Int. Cl. .............................................. H03k 13/24

[58] Field of Search ............................ 340/347 DD; 325/38 R, 38 A, 41, 42

[56] References Cited

UNITED STATES PATENTS

| | | | |
|---|---|---|---|
| 3,369,229 | 2/1968 | Dorros | 340/347 DD |
| 3,521,274 | 7/1970 | Sawai | 340/347 DD X |
| 3,560,856 | 2/1971 | Kaneko | 325/38 A |
| 3,587,088 | 6/1971 | Franaszek | 340/347 DD |
| 3,611,141 | 10/1971 | Waters | 325/41 |

*Primary Examiner*—Charles D. Miller
*Attorney*—Abraham A. Saffitz

[57] ABSTRACT

A communication system in which binary coded pulses are translated into multi-level pulses before being transmitted through a communication circuit, at the receiving end of which they are reconverted into binary coded pulses. The binary pulses are grouped into words of $n$ bits, to each of which a $(n+1)$th-bit of constant value is added. The $(n+1)$ bit words are subdivided into $k$ partial words each having $q$ bits, with $(n+1)$ equal to the product kq. Each one of the partial words is translated into a multi-level pulse of one or the other polarity according to the algebraic sign of the sum of the positive and negative amplitudes of the previously transmitted multi-level pulses. A method for the insertion of synchronization words is described. At the receiving end of the system, the $(n+1)$th-bit in each group of $k$ partial words is used for controlling the correct restitution of the original binary coded word, by eliminating the ambiguity which otherwise could result from the fact that different multi-level pulses may correspond to identical binary coded partial words, according to their position in the sequence of these words.

4 Claims, 3 Drawing Figures

COMMUNICATION SYSTEM USING BINARY TO MULTI-LEVEL AND MULTI-LEVEL TO BINARY CODED PULSE CONVERSION

BACKGROUND OF THE INVENTION

Field of the Invention

The present invention relates to a high-velocity multi-level pulse code transmission systems communication system for operation on high quality communication circuits, such as coaxial cables, in which, at the transmitting end of the system, a sequence of binary coded pulses is translated into a sequence of multi-level coded pulses of either polarity and in which, at the receiving end of the system, the latter sequence is translated into a sequence of binary coded pulses identical with the former one.

In communication systems of this kind using baseband signals, that is in systems in which the binary coded pulses constituting the information are transmitted through a communication circuit without undergoing as a whole a previous frequency shift, the generally considered frequency band covers the range the zero frequency to an upper frequency below which most of the signal energy is confined. If transmission is to take place through a communication circuit including repeaters, the transformers and filters included in the repeaters are likely to cause a low frequency cut-off. Such low frequency cut-off causes distortion in signal waveforms if the signals contain low frequency components and thus entails higher error rates in the information transmitted. It is known that such an effect is more detrimental to the operation of multi-level pulse code systems than to that of binary-coded pulse systems.

Description of the Prior Art

Various methods have been proposed for giving the spectral density versus frequency curve of the transmitted sequence of multi-level pulses a shape displaying zero values at both zero frequency and the recurrence frequency of the latter pulses. More precisely, it has been proposed to select the so-called code "format" in such a manner that the sum of the levels of the pulses in such a format has a given value, for instance, the zero value. For instance, in the U.S. Pat. Ser. No. 3,518,662, granted June 30, 1970 to Y. Nakagone et al., a multi-lever "balanced" code is proposed in which the multi-level code words each have *n* bits, and each bit of a code word has *l* possible levels, the sum of the levels of the bits in each such word being chosen equal to *j*. The number of the possible code words depends on the values of *l*, *n* and *j*. These values are selected, according to the number of bits in the binary code words to be converted into multi-level code words, so as to make a multi-level code word correspond to each binary code word. If, for instance, the binary words comprise five bits, the number of the possible different binary code words is equal to 32. Taking $l = 4$, $n = 4$ and $j = 0$, there are obtained 44 possible words with 4 bits and 4 levels per bit, and it is possible to make 32 of these 44 words correspond one-by-one to the 32 binary word values. If *j* is taken equal to zero, the average direct-current component of the signals transmitted according to such a system is rigorously zero. However, a drawback of the system is that the bit number in a multi-level code word into which a binary code word is to be converted cannot be lower than two and, in some cases, is not much lower than the bit number in the latter binary word, which seriously limits the frequency bandwidth economy obtainable in the said system.

In another known system (cf. "Multi-level PCM Transmission over a Cable using Feedback balanced Code," by Hisashi Kaneko and Akira Sawai, published in the Japanese review "Nippon Electric Company Journal," vol. 23, Oct. 1967, pages 508—513) the balancing of the code is obtained by feedback of the direct-current component of the converted signals. Binary words are translated into multi-level pulses, and some of the latter or all of them polarity invertible. According to the polarity of the resulting direct-current component, a binary word having a given binary value is selectively converted into a multi-level pulse having either of a positive and a negative polarity, according to whether the direct-current component or, in an equivalent manner, the "current sum," that is the algebraic sum of all of the already produced multi-level pulses is negative or positive. By way of example, taking the case of two-bit binary words, there are made to correspond:

to 00, a zero pulse to 01, a (+2) or a (−2) pulse to 10, a (−1) pulse to 11, a (+1) pulse In other words, a (+2) pulse is made to correspond to the binary group (01) when the "current sum" of the previously produced multi-level pulses is negative, while a (−2) pulse corresponds to the same binary group (01) when the said current sum is positive. This balanced code multi-level system is known under the name of FBC (Feedback Balanced Code) system. It may be "complete"or "partial" that is there may exist a double selective correspondence between a binary word and a multi-level pulse for every binary word or for some of them only, eventually for one of them only. A drawback of this system is that the number of the possible different levels applied to the communication circuit is higher than the strictly necessary one.

SUMMARY OF THE INVENTION

An object of the present invention is to provide a binary coded sequence to multi-level pulse sequence converter in which the binary sequence is decomposed into words each comprising a given number of bits and in which there is made to correspond to each such word a new word consisting of a plurality of multi-level pulses, this being done in a single operation.

Another object of the invention is the building of a converter in which a "forbidden" multi-level digit word is inserted at regular intervals in messages to be transmitted, in order to facilitate, at the receiving end of the system, the re-grouping of multi-level pulses into multi-level words and at the same time to automatically correct the attenuation variations of coaxial cables (or other communication circuits), by ensuring that the peak positive and negative values of the transmitted signals be reached frequently enough.

In the following, where it is conventionally assumed that one makes a p-bit binary word of arithmetic value higher or lower than $(2^{p-1} - \frac{1}{2})$ correspond to a positive or negative multi-level pulse, respectively, it will be said that conversion is direct. If, on the contrary, to a p-bit binary word of arithmetic value higher or lower than $(2^{p-1} - \frac{1}{2})$, there is made to correspond a negative or positive multi-level pulse respectively, it will be said that conversion is "opposite." By arithmetic or weighted value of the binary word $(a_n, a_{n-1}, \ldots a_1, a_o)$ there is understood, as usual, the quantity:

$$a_n 2^n + \ldots a_i 2^i + \ldots + a_1 2^1 + a_o 2^o$$

where the $a_i$'s have either of the 0 and 1 values.

In the converter according to the invention, the $n$-bit words to be converted into groups of multi-level pulse words are first converted into $(n+1)$ bit binary words by insertion, in a position corresponding to a predetermined binary weight, the zero binary weight position for instance, of a bit of known value, 1 for instance. This extra bit serves to ascertain, prior to the reconversion of the multi-level pulse words into binary words at the receiving end of the system, whether the binary to multi-level conversion has been a direct or an opposite one. If the same bit, after the receiving end conversion, is found to be still a "1," this means that the conversion has been direct; if, on the contrary, the said bit is found to be a "O," this shows that the conversion has been opposite.

At the transmitting end of the system, the $(n+1)$ bit words are thereafter decomposed into a number $k$ of partial words each of which has $(n+1)/k$ bits and is to be converted into a multi-level pulse. For each such partial word, the algebraic value of the difference between the weighted value of the word and the half of its maximum possible weighted value is determined. The so determined quantities are designated, in the following, by $\sigma_1, \sigma_2, \ldots \sigma_k$. Thereafter the algebraic sign of the quantity $(\sigma_1 + \sigma_2 + \ldots \sigma_k)$ is determined, and the latter sign is compared with that of the "current sum" of the amplitudes of the previously transmitted multi-level pulses.

In a more precise manner, and assuming $n$ to be equal to 5, the binary data to be converted are decomposed into successive 5-bit words, such as (in binary notation):

$$M = a_5\, a_4\, a_3\, a_2\, a_1$$

from which one forms the 6-bit words:

$$m = a_5\, a_4\, a_3\, a_2\, a_1\, \mathbf{1}$$

by adding a "1" in the zero binary weight position.

The $m$ words are thereafter decomposed into 3-bit partial words:

$$m_1 = a_5\, a_4\, a_3\ ;\ m_2 = a_2\, a_1\, \mathbf{1}$$

These partial words have a weighted value which can be higher or lower than the half of their maximum weighted value. Where 3-bit partial words are considered, their number is eight, and their maximum weighted value is $2^3-1 = 7$. There are four such words having a weighted value higher than 3.5 and four other words having a weighted value lower than 3.5. Or, which amounts to the same, there are four of them at least equal to 4 and four of them smaller than 4.

One forms the quantities:

$$\sigma_1 = 4a_5 + 2a_4 + a_3 - 3.5$$

$$\sigma_2 = 4a_2 + 2a_1 + 1 - 3.5$$

the signs of $\sigma_1$ or $\sigma_2$ will be called "weighted polarities of the partial words."

Thereafter, one forms the quantity:

$$\sigma_1 + \sigma_2 = 4a_5 + 2a_4 + a_3 + 4a_2 + 2a_1 + 1 - 7$$

the sign of which is determined. The latter sign is composed with that of the amplitudes of the current sum $\Sigma$ of the multi-level pulses already transmitted. If the product of the signs of $(\sigma_1 + \sigma_2)$ and $\Sigma$ is negative, eight-level pulses of the same polarity as the partial words are transmitted; if the product of the said signs is positive, eight-level pulses of the polarity opposite to that of the partial words are transmitted.

According to a feature of the invention, the "polarity invertible" correspondence between the binary words and the multi-level pulses which depends on the sign of the product of the "polarity" of the partial words and "polarity" of the current sum of the multi-level pulses is advantageously replaced by two cascaded correspondences : a polarity invertible correspondence between the input binary words and provisionally formed binary words and a fixed correspondence between these provisionally formed binary pulses and the multi-level pulses.

More precisely, in addition to the binary word m and partial words $m_1$ and $m_2$, the so-called bar-word $\overline{m}$ and partial bar-words $\overline{m}_1$ and $\overline{m}_2$:

$$\overline{m} = \overline{a}_5\, \overline{a}_4\, \overline{a}_3\, \overline{a}_2\, \overline{a}_1\, \mathbf{0}$$

$$\overline{m}_1 = \overline{a}_5\, \overline{a}_4\, \overline{a}_3$$

$$\overline{m}_2 = \overline{a}_2\, \overline{a}_1\, \mathbf{0}$$

according to the definiations of Boolean Algebra, are also provisionally formed and, according to the relative signs of $(\sigma_1 + \sigma_2)$ and $\Sigma$, the partial words $m_1$ and $m_2$ or the partial bar-words $\overline{m}_1$ and $\overline{m}_2$ are selected and stored. Then each stored partial word or partial bar-word is converted into a multi-level word pulse, this is a fixed manner and without any invertibility. As there is a fixed correspondence between the stored partial or partial bar words and the multi-level pulses, the sign of the current sum $\Sigma$ of the latter can be replaced by the sign of the current sum $\Sigma'$ of the former.

From what has just been said, it results that any 6-bit word is converted into a two-element multi-level pulse word within a single operation, each of the two multi-level pulses of the multi-level word corresponding to a 3-bit partial word contained in the 6-bit binary word. The sign of the sum of the two quantities $\sigma_1$ or $\sigma_2$ (as above-defined) corresponding to the two partial words is determined, and the conversion of each partial word to a pulse in the eight-level pulse word is direct or opposite for the assembly of the two partial words. This means that it cannot happen that the conversion be direct for one of the partial words and opposite for the other partial word.

It is thus apparent that the system of the invention may be generalized. By way of example, in the case of $n = 14$, a polarity conversion identification bit may be added, so as to form 15-bit words that are decomposed into three 5-bit words. Thus:

$$m_1 = a_{14}\, a_{13}\, a_{12}\, a_{11}\, a_{10}$$

$$m_2 = a_9\, a_8\, a_7\, a_6\, a_5$$

$$m_3 = a_4\, a_3\, a_2\, a_1\, \mathbf{1}$$

$$\sigma_1 = 16\, a_{14} + 8\, a_{13} + 4\, a_{12} + 2\, a_{11} + a_{10} - 15.5$$

$$\sigma_2 = 16\, a_9 + 8\, a_8 + 4\, a_7 + 2\, a_6 + a_5 - 15.5$$

$$\sigma_3 = 16\, a_4 + 8\, a_3 + 4\, a_2 + 2\, a_1 + 1 - 15.5$$

and thereafter the quantity $(\sigma_1 + \sigma_2 + \sigma_3)$ is formed and its sign determined. Effecting the product of the sign of $(\sigma_1 + \sigma_2 + \sigma_3)$ by that of the current sum $\Sigma'$, and according to the sign of this product, 32-level pulses are made to correspond respectively to $m_1$, $m_2$, $m_3$, their sign being so chosen as to be the same as that of $m_1$, $m_2$, $m_3$ or the opposite one, according to the sign of the said product.

The following table shows, in the case of some 5-bit words, the quantities formed by the "binary-to-multi-level word converter" of the invention.

| words $m$ | words $+m_1$ and $\overline{m}_1$ | words $m_2$ and $\overline{m}_2$ | sums $\sigma_1$ | sums $\sigma_2$ | sums $(\sigma_1 + \sigma_2)$ |
|---|---|---|---|---|---|
| 00000 | 000 | 001 | −3.5 | − 2.5 | − 6 |
| " | 111 | 110 | + 3.5 | + 2.5 | + 6 |
| 00001 | 000 | 011 | − 3.5 | − 0.5 | − 4 |
| " | 111 | 100 | + 3.5 | + 0.5 | + 4 |
| 00010 | 000 | 101 | − 3.5 | + 1.5 | − 2 |
| " | 111 | 010 | + 3.5 | − 1.5 | + 2 |
| 00011 | 000 | 111 | − 3.5 | + 3.5 | 0 |
| " | 111 | 000 | + 3.5 | − 3.5 | 0 |
| 00100 | 001 | 001 | − 2.5 | −2.5 | −5 |
| " | 110 | 110 | + 2.5 | +2.5 | +5 |

The words having a zero $(\sigma_1 + \sigma_2)$ sum may be considered, at will, as positive or negative ones.

SHORT DESCRIPTION OF THE DRAWINGS

The invention will now be described in greater detail with reference to the annexed drawings, in which.

DESCRIPTION OF PREFERRED EMBODIMENTS

Figure 1:
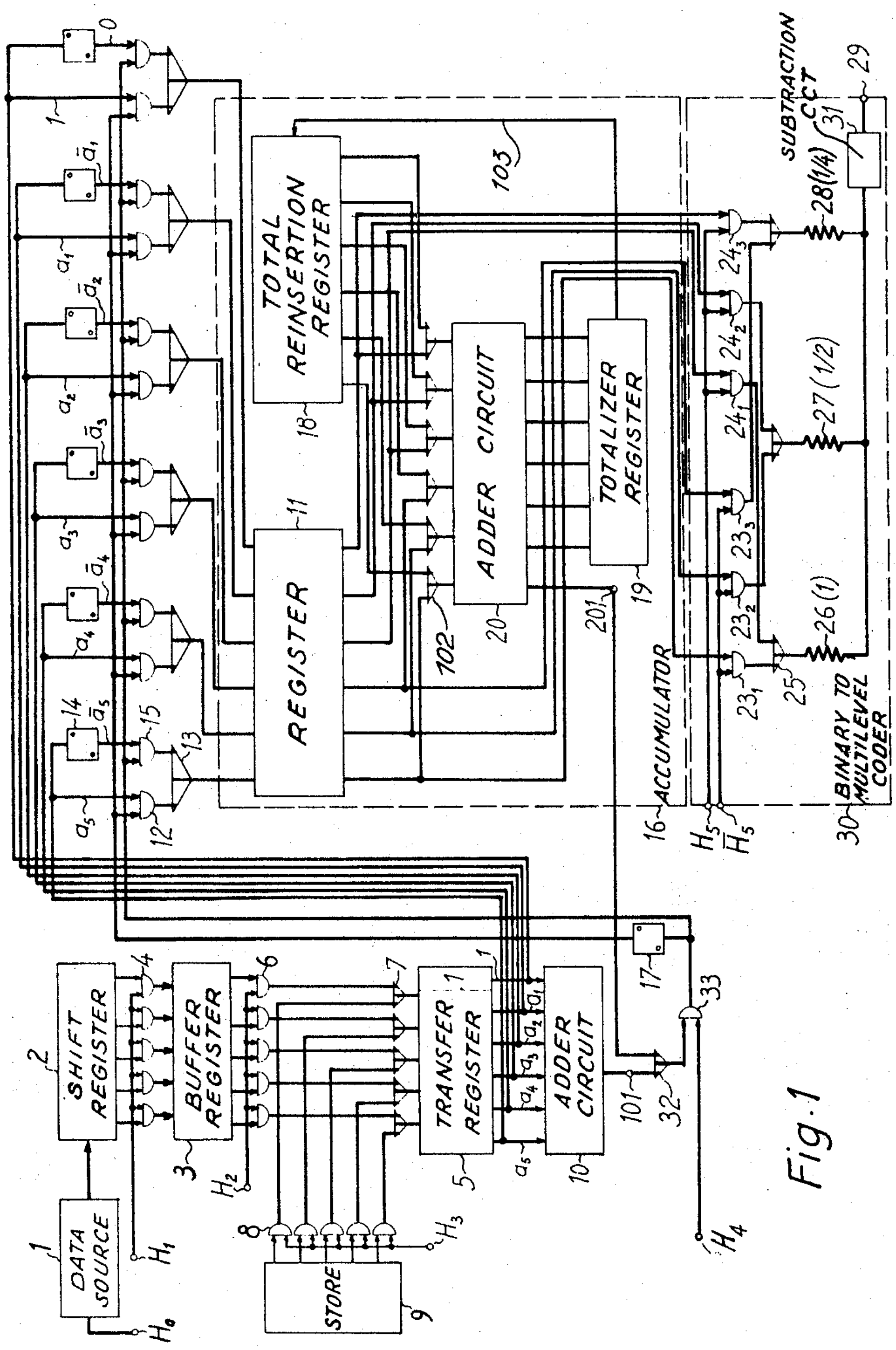
FIG. 1 shows, in block diagram form, the "binary-to-multi-level" converter of the invention.

Referring first to FIG. 1, the binary coded pulses delivered by a source 1 of coded data are sequentially applied, at the frequency $f_o$, to a shift register 2 operating as a series to parallel converter.

From the latter shift register the signals are parallel-transferred, as five-digit binary words, into a buffer register 3 through "AND" gates 4 and thereafter into a transfer register 5 through "AND" gates 6 and "OR" gates 7. The transfer register 5 also receives at suitable times a synchronization word, which will be assumed to be the word 00011, through the "AND" gates 8 and the "OR" gates 7. The synchronization word is recorded in a store 9 and is transmitted at said times under the control of clock signals applied to terminal $H_3$.

The lowest binary weight stage of register 5 is permanently set on position 1.

The outputs of transfer register 5 are connected to an adder circuit 10 which calculates values $\sigma_1$ and $\sigma_2$ respectively equal to the weighted values of $m_1$ and $m_2$ less 3.5, as well as the sum of these two calculated values, to determine the sign of the result $(\sigma_1 + \sigma_2)$ which sign is obtained at the output 101 of circuit 10.

Bits $a_5$, $a_4$, $a_3$, $a_2$, $a_1$, 1, available at the outputs of transfer register 5, are also applied in parallel to the inputs of a register 11, on one hand directly through one of the inputs of "AND" gates such as 12 and "OR" gates such as 13, and on the other hand through inverters such as 14, "AND" gates 15 and "OR" gates such as 13.

The accumulator circuit 16 includes said register 11, a second register 18, which may be called "total reinsertion register," an addition circuit 20 and an output totalizer register 19, the contents of which is fed back through a multiple connection 103 to register 18. Circuit 20, fed from 11 and 18 through "OR" gates such as 102, is similar to adder circuit 10 and delivers at one of its outputs 201 the sign of the current sum $\Sigma'$. The outputs 101 and 201 of the adder circuits 10 and 20 are respectively connected to one and the other of the inputs of an "EXCLUSIVE OR" circuit 32. The output of 32 is connected through an "AND" gate 33 and an inverter 17 to the other input of the "AND" gates such as 12, while the output of 33, the opening of which is controlled by clock signals applied to terminal $H_4$, is directly connected to the second input of the "AND" gates such as 15.

It results therefrom that, if the sum $(\sigma_1 + \sigma_2)$ has the same sign as the current sum $\Sigma'$, the signals transferred to register 11 will be $\overline{m}_1$ and $\overline{m}_2$ while, if the sum $(\sigma_1 + \sigma_2)$ has the opposite sign to that of $\Sigma'$, the signals $m_1$ and $m_2$ will be transferred into register 11.

The outputs of register 11 are connected to the "binary-to-multi-level" coder 30. The first three outputs of register 11 are respectively connected through "AND" gates $23_1$, $23_2$, $23_3$ and "OR" gates such as 25 to three resistors 26, 27 and 28 having resistance values proportional to ¼, ½ and 1 and whose ends are connected in parallel to point 29. In a similar manner, the last three outputs of adder 20 are connected to the same resistors through "AND" gates $24_1$, $24_2$, $24_3$ and "OR" gates such as 25.

If the eight levels of the multi-level pulses are ± 0.5, ± 1.5, ± 2.5 and ± 3.5, a "by 3.5" reducing subtractor 31 must be inserted in coder 30 before its output 29.

The two partial words resulting from the synchronization word 00011 are always transmitted by direct conversion.

Figure 2:
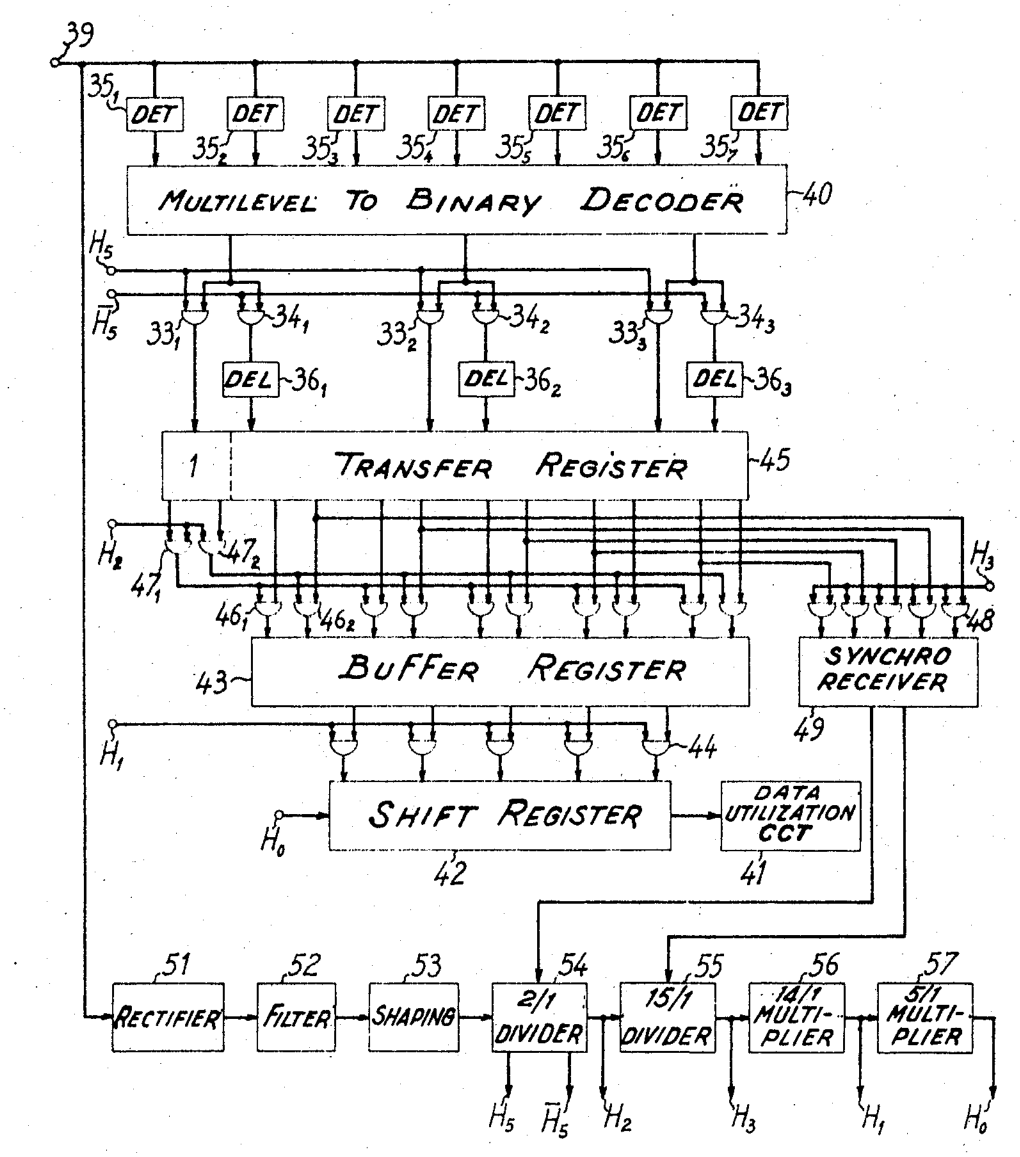
FIG. 2 shows, in block diagram form, the "multi-level-to-binary" converter of the invention.
Figure 3:
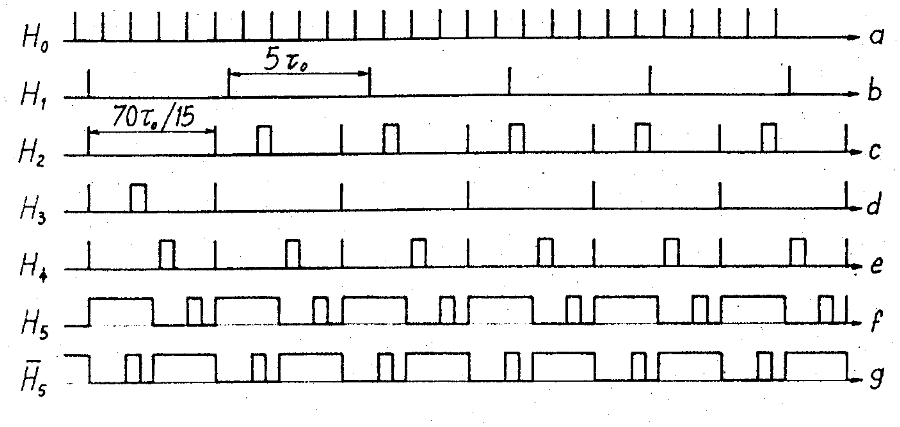
FIG. 3 is a diagram showing the timing clock signals applied to various points of the diagrams of FIGS. 1 and 2.

FIG. 3 shows the timing signals respectively applied to various points designated by the same letters in FIGS. 1 and 2.

In FIG. 3, signal $H_0$ of line *a* represents pulses of period $\tau_0$ defining the instants at which appear the bits supplied by source 1. Signal $H_1$ of line *b* represents pulses of period 5 $\tau_0$ applied to terminal $H_1$. Signal $H_2$ of line *c* represents pulses having a period equal to 14/15 of 5 $\tau_o$, i.e. 70/15 of $\tau_o$, applied to terminal $H_2$. Thus 14 words enter register 3 during a time interval 70 $\tau_o$, while 15 words enter register 5 during the same time interval. It is thus possible to admit the synchronization word in 5 together with 14 words to be transmitted, during the said time interval 70 $\tau_o$. Signal $H_3$ in FIG. 3 is applied to terminal $H_3$ in FIG. 1.

In FIG. 3, line *e* shows the signal applied to terminal $H_4$ and lines *f* and *g* show two series of pulses, each having a 70 $\tau_o$/15 period, but in phase quadrature. The first series corresponds to the transmission instants of the first multi-level pulse in each multi-level pulse word, while the second series corresponds to the transmission instants of the second multi-level pulse in the same word.

The "multi-level-to-binary" word converter is shown in FIG. 2.

In FIG. 2, the input terminal 39 is parallel-connected to seven amplitude detectors $35_1$ to $35_7$, each of which delivers or not an output signal according to whether the amplitude of the received pulse lies or not within a corresponding amplitude range, comprised in a series of juxtaposed such amplitude ranges. These amplitude detectors are connected to a "multi-level-to-binary" decoder 40, which is identical with the coder 30 of FIG. 1, operating in the reverse direction. Decoder 40 has three outputs at which the partial 3-bit words are obtained, at a recurrence frequency equal to that of the multi-level pulses.

These partial words are applied to the transfer register 45, on one hand through "AND" gates $33_1$, $33_2$, $33_3$ and on the other hand through "AND" gates $34_1$, $34_2$, $34_3$ and delay circuits $36_1$, $36_2$, $36_3$. Gates $33_1$, $33_2$, $33_3$ and $34_1$, $34_2$, $34_3$ are opened by timing signals synchronized with $H_5$ and $\overline{H}_5$ (FIG. 3), each of the latter signals recurring at the frequency of the multi-level words; the conversion polarity identification bit is received in the zero binary weight stage of register 40. This stage has its two outputs respectively connected to "AND" gates $47_1$ and $47_2$, opened by a timing signal synchronized with $H_2$.

The "zero" and "one" outputs of the stages of transfer register 45 are connected to a buffer register 43, respectively through "AND" gates such as $46_1$ and $46_2$. The first ones of these gates are open when the abovesaid identification bit is a "one," while the second ones are open when the identification bit is a zero.

The outputs of the buffer register 43 are connected with the shift register 42 through "AND" gates 44 opened by a timing signal synchronous with $H_1$. The data extracted from 42 are directed to a data utilization circuit 41 under the control of a timing signal synchronous with $H_o$.

The synchronization word never being transformed into a "bar" word, the "one" outputs of the transfer register 45 are connected through "AND" gates 48 to the receiver circuit for the said synchronization word. The latter "AND" gates are opened by a timing signal synchronous with $H_3$.

The input terminal 39 of the "multi-level-to binary" word converter is also connected with a synchronization chain consisting of a rectifier 51, a filter 52, a shaping circuit 53, a divider-by-two 54, a divider-by-15 55, a 14-times multiplier 56 and a 5-times multiplier 57. Clock signals $H_o$ are thus obtained, as well as multi-level half-word timing signals $H_5$ and $\overline{H}_5$, multi-level word timing signals $H_3$ and binary word timing signals $H_1$.

The synchronization word receiver 49 controls circuits 54 and 55, in order to synchronize them. Synchronization correction circuits are well-known in coded pulse transmission technique, and it is unnecessary to describe them in detail here.

The advantages of the digital transmission system of the invention will now be discussed. These advantages principally result from the fact that the sign of the words to be transmitted is not the sign of the word proper but a linear combination of the signs of the partial words.

The sign of a non-divided word of ($n$+1) bits from the viewpoint of the invention is nothing else than that of the value of the bit of highest weight $a_n$ of the word, the sign being considered negative if $a_n$ is zero and positive if $a_n$ is one. A ($n$+1) bit word can take $2^{n+1}$ possible values including zero and it is considered negative for the $2^n$ values higher than $2^n-1$ and positive for the $2^n$ values equal to or lower than $2^n-1$. The sign changes only one time at the middle of the word value range. This is not favourable for PCM transmission since high and small samples, higher and lower respectively than the mid value of the sample range are not equiprobably distributed in a PCM signal.

The sign of the word divided into partial words is the linear combination, modulo 2 :

$$a_{k(n+1/k-1)} + \ldots + a_{2(n+1/k-1)} + a_{(n+1/k-1)}$$

where $k$ is as previously the number of partial digits. If the $2^{n+1}$ possible values of the word are written along a line, the sign of the divided word changes every $2^{(n+1)/k-1}$ values, then every $2^{2(n+1)/k-1}$ values and so on and finally every $2^n$ word values.

Example A $n = 5$ $k = 3$ $n+1/k = 2$

The following table shows the positive and negative values of the 64 possible words. The sign of the words changes every 2, 8 and 32 successive values of the words.

| | | | | | | | |
|---|---|---|---|---|---|---|---|
| 0+ | 1+ | 2− | 3− | 4+ | 5+ | 6− | 7− |
| 8− | 9− | 10+ | 12+ | | 13− | 14+ | 15+ |
| 16+ | 17+ | 18− | 19− | 20+ | 21+ | 22− | 23− |
| 24− | 25− | 26+ | 27+ | 28− | 29− | 30+ | 31+ |
| 32− | 33− | 34+ | 35+ | 36− | 37− | 38+ | 39+ |
| 40+ | 41+ | 42− | 43− | 44+ | 45+ | 46− | 47− |
| 48− | 49− | 50+ | 51+ | 52− | 53− | 54+ | 55+ |
| 56+ | 57+ | 58− | 59− | 60+ | 61+ | 62− | 63− |

Example B $n = 5$ $k = 2$ $(n+1)/k = 3$

The following table shows the positive and negative values of the 64 possible words. The sign of the words changes every 4 and 32 successive values of the words.

| | | | | | | | |
|---|---|---|---|---|---|---|---|
| 0− | 1− | 2− | 3− | 4+ | 5+ | 6+ | 7+ |
| 8− | 9− | 10− | 11− | 12+ | 13+ | 14+ | 15+ |
| 16− | 17− | 18− | 19− | 20+ | 21+ | 22+ | 23+ |
| 24− | 25− | 26− | 27− | 28+ | 29+ | 30+ | 31+ |
| 32+ | 33+ | 34+ | 35+ | 36− | 37− | 38− | 39− |
| 40+ | 41+ | 42+ | 43+ | 44− | 45− | 46− | 47− |
| 48+ | 49+ | 50+ | 51+ | 52− | 53− | 54− | 55− |
| 56+ | 57+ | 58+ | 59+ | 60− | 61− | 62− | 63− |

The method used according to the invention for determining the word sign, consisting in forming a linear combination of the partial word signs, results in more frequent sign changes when the words successively take the whole possible range of their values. As two adjacent values or two almost adjacent values of a word to be transmitted are equiprobable in a PCM signal; the occurrence of the input symbols, that is the signs of the words to be converted, is equiprobable. It has been shown in the Japanese article above referred to (page 510) that in such a case the spectral density of the multilevel sequence has zeros at d.c. and at the recurrence frequency of the multilevel pulses and its multiples and a waveform substantially symmetrical with respect to the mid-frequencies between these zeros.

When $\sigma_1$, $\sigma_2$ are not taken equal to the highest weight bit of the partial words but are calculated according to the formulae giving their very values, the signs are not exactly distributed as explained in the foregoing due to word values for which the sign is zero. But the changes of sign are nevertheless more frequent than if the sign was derived from the non-divided word.

I claim:

1. In a communication system including a transmitting end and a receiving end between which signals in the form of multi-level pulse words are transmitted through a communication circuit, said system comprising at said transmitting end first converter means for converting $n$-bit binary words into multi-level pulse words and at said receiving end second converter means for converting multi-level pulse words into $n$-bit binary words, the arrangement in which said first converter means comprises means for adding to each n-bit word and in a predetermined weight postion therein an additional bit having a predetermined value so as to obtain a modified $(n+1)$ bit word, means for decomposing each such $(n+1)$ bit word into a number $k$ of partial binary coded words each having $q = (n+1)/k$ bits, means for deriving from each of said partial $q$-bit words the binary weighted sum of its $q$ bits by adding the products of the binary values of a given polarity of said $q$ bits by powers of two respectively equal to the binary weights of said $q$ bits, means for deriving from said weighted sum a reduced sum having either of two possible polarities by substracting from said weighted sum one half of its maximum possible value, addition means for adding all of said reduced sums derived from the $k$ partial words pertaining to the same $(n+1)$ bit binary word for obtaining a resultant sum, means for determining the algebraic sign of said resultant sum, means for determining at any instant the algebraic sign of the current sum of the amplitudes of all previously transmitted multi-level pulses and for comparing said sign with that of said resultant sum, and coder means translating each one of said partial words into a first multi-level pulse having a given polarity when said signs are different and into a second multi-level pulse of the opposite polarity when said signs are the same, said first and second multi-level pulses being respectively derived from said one of said partial words and from a complementary word derived therefrom by substituting therein one bits for zero bits and zero bits for one bits, and in which said second coverter means at said receiving end comprises means for storing said additional bit and decoder means translating multi-level pulses into a partial binary coded pulse word for a given one of the two possible values of said additional bit and into the complementary partial binary coded pulse word when said additional bit has the other one of said two possible values.

2. An arrangement as claimed in claim 1, in which said first converter means at said transmitting end includes means for adding to each group comprising a given number of $n$-bit binary words to be converted a synchronization word having $n$ binary bits and means for inhibiting the coder means coding each partial word into a multi-level pulse when the partial words obtained by decomposing said synchronization word are applied to said coder means; and in which said second converter means at said receiving end include a detector circuit detecting said synchronization word and a synchronization correction circuit controlled by said detector circuit.

3. An arrangement as claimed in claim 1, in which said means for determining the algebraic sign of said current sum consists of means for determining the algebraic sign of the current sum of all said resultant sums.

4. An arrangement as claimed in claim 1, in which the numbers $n$, $k$ and $q$ are respectively given the values 5, 2 and 3.

* * * * *